United States Patent [19]

Torok et al.

[11] 3,957,527

[45] May 18, 1976

[54] COLOR DEVELOPING SUBSTRATES FOR MANIFOLD COPY SYSTEMS AND PROCESS FOR PRODUCING THE SAME

[75] Inventors: Andrew Torok, Parsippany; Thomas F. Walsh, Florham Park, both of N.J.

[73] Assignee: Georgia Kaolin Company, Elizabeth, N.J.

[22] Filed: July 29, 1974

[21] Appl. No.: 492,682

[52] U.S. Cl. .............................. 106/306; 106/288 B; 252/450
[51] Int. Cl.² ...................... C09C 1/02; C09C 1/42
[58] Field of Search ................. 106/306, 288 B, 72; 282/450

[56] References Cited
UNITED STATES PATENTS

| | | | |
|---|---|---|---|
| 3,533,821 | 10/1970 | Lundquist | 106/306 |
| 3,622,364 | 11/1971 | Sugahara et al. | 106/72 |
| 3,753,761 | 8/1973 | Sugahara et al. | 106/288 B |

*Primary Examiner*—Winston A. Douglas
*Assistant Examiner*—J. V. Howard
*Attorney, Agent, or Firm*—Buell, Blenko & Ziesenheim

[57] ABSTRACT

Improved reactive color developing substrates for manifold copy systems are produced by controlled acid treatment of smectite clay minerals, followed by severe attrition grinding to produce an aqueous colloidal suspension of the acid treated smectite. Thereupon, the colloidalized acid treated smectite is combined with an aqueous suspension of talc, thoroughly blended and co-precipitated by the addition of appropriate flocculants such as aluminum sulfate.

11 Claims, No Drawings

COLOR DEVELOPING SUBSTRATES FOR MANIFOLD COPY SYSTEMS AND PROCESS FOR PRODUCING THE SAME

This invention relates to improved color developing substrates for manifold copy systems and process for producing the same and particularly to reactive color developing substrates for use in manifold copy systems which utilize leuco dyes as color precursors. More specifically, the invention relates to activated smectite clay minerals to be used as receiving substrates in manifold copy systems which employ the use of microencapsulated leuco-dye solutions. Upon applied pressure, the microcapsules rupture, thereby releasing the leuco-dye solution which impinges upon the reactive smectite substrate, producing a colored image. This type of manifold copy system is described in U.S. Pat. No. 2,548,366.

The leuco-dye color precursors are of two classes:

a. Primary Color Development

These are leuco-dyes which develop intense colors immediately upon contact with a reactive substrate. Examples of this type of leuco-dye are crystal violet lactone [3,3-bis (p - dimethylaminophenyl)-6-dimethylphthalide] and Michelor's Hydrol.

b. Secondary Color Development

These are leuco-dyes which do not immediately develop color upon contact with a reactive substrate, but develop intense light-fast images after several hours. The most frequently used leuco-dye of this class is benzoyl leuco-methylene blue.

The activation of montmorillonites, e.g. bentonite and other clay minerals by acid leaching is well known in the art. This is thoroughly discussed in U.S. Pat. Nos. 2,464,127 and 2,981,697.

The use of acid activated montmorillonites as well as acid activated kaolins in reactive substrates for manifold copy systems is well known. This is disclosed in U.S. Pat. Nos. 3,293,060 and 3,622,364 and in British Pat. Nos. 1,232,208 and 1,307,319.

We have discovered unique reactive color developing substrates which have greater color developing capacities than heretofore available.

We have discovered that these unique superior substrates can be prepared by controlled acid leaching of smectite clay minerals. The so acid leached smectite in aqueous suspension is subjected to severe attrition grinding by means of a suitable ball mill or, preferably, a sand or bead grinder. The colloidalized acid leached smectite suspension is blended with a suspension of a well dispersed talc. After thorough mixing of the two components, a co-precipitation or co-flocculation is achieved by the addition of aluminum, sulfate, sulfuric acid, calcium chloride or other suitable flocculating agents well described in literature, and familiar to those versed in the art.

The co-flocculated product is then recovered by filtering and drying of the solids obtained. The dried solids can be subjected to pulverization to afford better handling in application of the product.

When the reactive product prepared as described above is dispersed in water and blended with an appropriate binder such as latex (Dow 620), it can be coated on paper to form a color receiving substrate. When a solution of a primary leuco-dye such as crystal violet is contacted upon the thus coated substrate, a colored image of superior intensity is obtained.

Furthermore, we have discovered that when the coated substrate prepared as above is contacted with a solution of secondary leuco-dye, such as benzoyl leucomethylene blue, an intense image is obtained after several hours, which is far superior in intensity to that obtained from an acid leached smectite not prepared according to our invention. This is a very significant discovery since, heretofore, it was well known in the art that secondary dye development capacity was an inherent natural property of certain untreated smectite clay minerals which could not be enhanced by acid leaching. This is also clearly stated in U.S. Pat. No. 3,622,364 (column 8, lines 60–66).

It is also significant to note that it is well known that talc is non-reactive towards development of secondary leuco-dyes and only faintly reactive towards the primary leuco-dyes. We have found, surprisingly that as much as 50 percent of talc can be co-precipitated with colloidalized acid leached smectite with significant improvement in color image development capacity over the smectite alone.

The preferred starting materials for the product of this invention are smectite clays, preferably those smectites known as montmorillonite or bentonite. The selection of the specific montmorillonite to be used is not critical. It may be sodium or calcium montmorillonite as long as it is a commercial quality ore.

Acid activation of the montmorillonite is obtained by leaching the montmorillonite with hot diluted sulfuric or hydrochloric acid. The concentration range of anhydrous acid in water is 12 to 20 percent. The weight of acid used, calculated as anhydrous acid based on the weight of moisture free montmorillonite ranges 30 to 80 percent, preferably, 50 to 70 percent.

The montmorillonite is added to the diluted acid and mildly agitated while maintaining a reaction temperature range of 60° C. to 100° C. Reaction at stated temperature range is continued until a sample of rinsed reacted montmorillonite shows a hydrated silica content range of 15 to 30 percent. More preferably is a hydrated silica content range of 18 to 25 percent. The hydrated silica content is that silica which is readily soluble in a 2% sodium carbonate solution.

The completed acid leached montmorillonite is filtered free of residual acid and dissolved salts, and rinsed until substantially free of acid or soluble salts.

The rinsed acid leached montmorillonite is dispersed in water containing a dispersing agent such as sodium hexametaphosphate, tetrasodium pyrophosphate, ammonium citrate, or combinations thereof. The amount of dispersing agent added is in the range of 1 to 5 percent, based on the weight of moisture free acid leached montmorillonite. The % solids of montmorillonite to water is maintained in the range of 15 to 40 percent, preferably 20 to 30 percent.

The dispersed aqueous suspension of acid leached montmorillonite is subjected to intensive attrition by grinding in a sand mill or bead mill for at least five minutes or until 100 percent of the acid leached montmorillonite passes through a 325 mesh screen and the majority of particles are less than two microns ESD (equivalent spherical diameter). Similar results may be obtained by grinding the slurry in a ball mill for two to four hours.

A fine talc is dispersed in water to which has been added 0.5% sodium hexametaphosphate or TSPP or other dispersing agents known in the art. The range of solids to water is 20 to 65 percent by weight, preferably 35 to 65 percent by weight.

An amount of dispersed talc so calculated to be equal to 10 to 100 percent by dry weight of the dry basis acid activated montmorillonite is added to the colloidalized acid leached montmorillonite (i.e. 9 to 50 percent of the mixture on dry weight basis). The more preferred range of dry basis talc is 25 to 65 percent of dry basis montmorillonite by weight (i.e. 20 to 38 percent of mixture weight). The most preferable range is 25 to 40 percent by weight of the dry montmorillonite (i.e. 20 to 28 percent of mixture weight).

The dispersed talc and colloidalized acid leached montmorillonite are thoroughly blended until a homogeneous suspension is produced. Thereupon, the co-dispersed solids are co-flocculated by the addition of 0.1 to 1 percent of aluminum sulfate or other suitable flocculating agents.

The co-flocculated solids are dewatered by decantation or filtration, dried and pulverized.

The subject matter of this invention can, perhaps, best be understood by referring to the following example which is illustrative of the invention and of the surprising results which may be achieved by its practice.

TEST PROCEDURES

1. Paper Coating of Reactive Substrate

For the purpose of illustration of the utilization of the products of this invention, simple test paper coatings were prepared as follows:

Coating Formulation

| Water | 120 grams |
| Sodium Hexametaphosphate | 4 grams |
| Reactive Product of Invention (described below) | 80 grams |
| Dow 620 Latex (binder) | 16 grams |

Test coatings were applied to sheets of paper by means of a Mayer rod so that final dried coat weight equaled 2 lbs./Book Ream.

2. Developing Color Image of Leuco-dye
   a. 1 percent solution of crystal violet lactone in Xylene (CVL)
   b. 1 percent solution of benzoyl leuco-methylene blue in Xylene (BLMB)

The 1% CVL and 1% BLMB solutions are flowed onto individual sheets of paper coated with reactive product of invention. Sufficient amount of each solution is used to insure complete saturation of the reactive substrate with the leuco-dye.

3. Measurement of Developed Dye Intensity

The reflectance optical density of each color developed sheet is determined by means of a suitable recording spectrophotometer such as a Bausch & Lomb Spectronic 505 with a reflectance attachment. Each sheet is backed with a standard Vitrol No. 1 white opaque-glass plate.

CVL Image — Reflectance Optical Density is measured at 530 nm.

BLMB Image — Reflectance Optical Density is measured at 624 nm.

EXAMPLE NO. 1

500 grams (Dry Basis) of pulverized calcium montmorillonite from Nacogdoches, Texas were added to 350 grams of 96% sulfuric acid previously diluted with 2,000 ml. deionized water contained in a 4,000 ml. Pyrex beaker.

While maintaining continuous mild agitation, the acid-montmorillonite mixture was heated to 95° C. and held at this temperature for 12 hours, maintaining volume by addition of water as needed. At this time, the heating was discontinued, and the acid leached montmorillonite was recovered by filtration. The residual acid and acid salts were removed from the acid leached montmorillonite by continuous rinsing with fresh water until the rinse water was essentially free of soluble sulfates.

A sample of the rinsed acid leached montmorillonite was analyzed and found to contain 24% hydrated silica.

A portion of the rinsed and filtered acid leached montmorillonite was dried at 110° C. to 10 percent moisture content. The dried filter cake was pulverized to a fineness of 95 percent thru 200 mesh. This sample was designated Sample No. 1A.

Another portion of the rinsed acid leached montmorillonite filter cake was diluted with water to 20 percent solids. 1 percent of sodium hexametaphosphate, based on solids, was added to the dispersion. This fluid dispersion was introduced into a bead grinder which was charged with 10–20 mesh alumina beads. Attrition grinding of the acid leached montmorillonite was accomplished by agitating the bead-montmorillonite slurry mixture at 600 R.P.M. for 5 minutes. At this time, the montmorillonite slurry was separated from the grinding media and passed through a vibrating 325 mesh screen. Essentially, no residue remained on the 325 mesh screen. A particle size analysis of the attrition ground product showed it to be 100 percent less than 2 micrometers ESD.

In a separate container, 200 grams of finely divided talc known as Montana Talc No. 399 (Whitaker, Clark and Daniels, Inc.) was dispersed in 300 ml. of deionized water containing 1 gram of dissolved sodium hexametaphosphate.

750 grams of the slurry from Step 4 were blended with 93.8 grams of slurry from Step 5. This resulting mixture contained 150 grams of dry basis colloidalized acid leached montmorillonite and 37.5 grams, dry basis Montana Talc.

The mixture was well blended by agitation, and the solids were co-flocculated by the addition of 10 ml. of a 10% solution of aluminum sulfate.

The co-flocculated product was dewatered by filtration, dried at 110° C. and pulverized. This sample was designated Sample No. 1B.

Paper coatings were prepared with Samples No. 1A and No. 1B as outlined in test procedures above. CVL and BLMB images were developed on each sample coating, and the optical density of the colored images were determined according to test procedures. Results are recorded in Table I.

Table I

| Sample Number | Color Image | Optical Density | % Image Improvement $\frac{OD_B - OD_A (100)}{OD_A}$ |
| --- | --- | --- | --- |
| 1A | CVL | 0.545 | |
| 1B | CVL | 0.727 | 33.3 |
| 1A | BLMB | 0.630 | |
| 1B | BLMB | 0.772 | 22.5 |

While we have illustrated and described certain preferred practices and embodiments of our invention in the foregoing specification, it will be understood that this invention may be otherwise embodied within the scope of the following claims.

We claim:

1. An improved reactive color developing substrate for manifold copy systems comprising a dried coflocculated colloidalized acid treated smectite admixed with about 9 to 50 percent by weight of finely divided talc.

2. An improved reactive color developing substrate for manifold copy systems as claimed in claim 1 wherein the acid treated smectite has a particle size less than 325 mesh.

3. An improved reactive color developing substrate for manifold copy systems as claimed in claim 1 wherein the smectite and talc are co-flocculated.

4. An improved reactive color developing substrate for manifold copy systems as claimed in claim 1 wherein the talc is about 20 to 38 percent by weight of the mixture.

5. An improved reactive color developing substrate for manifold copy systems as claimed in claim 1 wherein the talc is about 20 to 28 percent by weight of the mixture.

6. A process for making an improved reactive color developing substrate comprising the steps of:

a. acid leaching smectite,
b. grinding the acid leached smectite to less than 325 mesh,
c. dispersing a finely divided talc in water,
d. adding to the dispersed talc an amount of ground acid leached smectite such that the talc forms 9 to 50 percent of the mixture by weight,
e. co-flocculating the smectite and talc from the dispersion,
f. recovering the co-flocculated smectite and talc and
g. drying the recovered co-flocculated smectite and talc.

7. A process as claimed in claim 6 wherein the talc is dispersed in the presence of a dispersion agent.

8. A process as claimed in claim 6 wherein the smectite-talc mixture contains 20 to 38 percent by weight talc.

9. A process as claimed in claim 6 wherein the smectite-talc mixture contains 20 to 28 percent by weight talc.

10. A process as claimed in claim 6 wherein the dispersed mixture of smectite and talc is co-flocculated by the addition of a flocculating agent.

11. A process as claimed in claim 10 wherein the flocculating agent is aluminum sulfate.

* * * * *